March 15, 1932.    C. E. McGUIRE    1,849,766
AIRPLANE
Filed Oct. 21, 1930    5 Sheets-Sheet 1
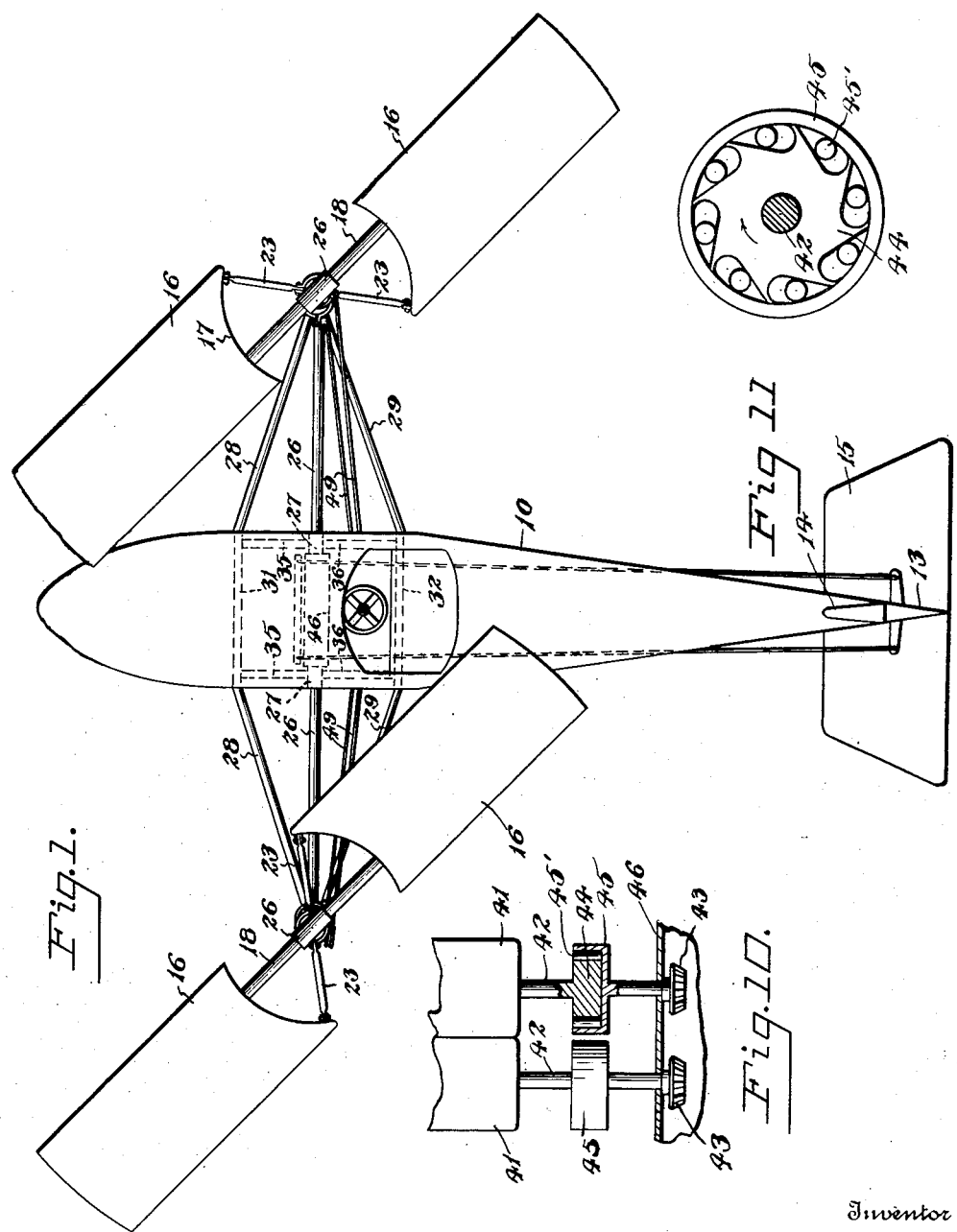
Inventor
C. E. McGuire
By Lacey & Lacey, Attorneys

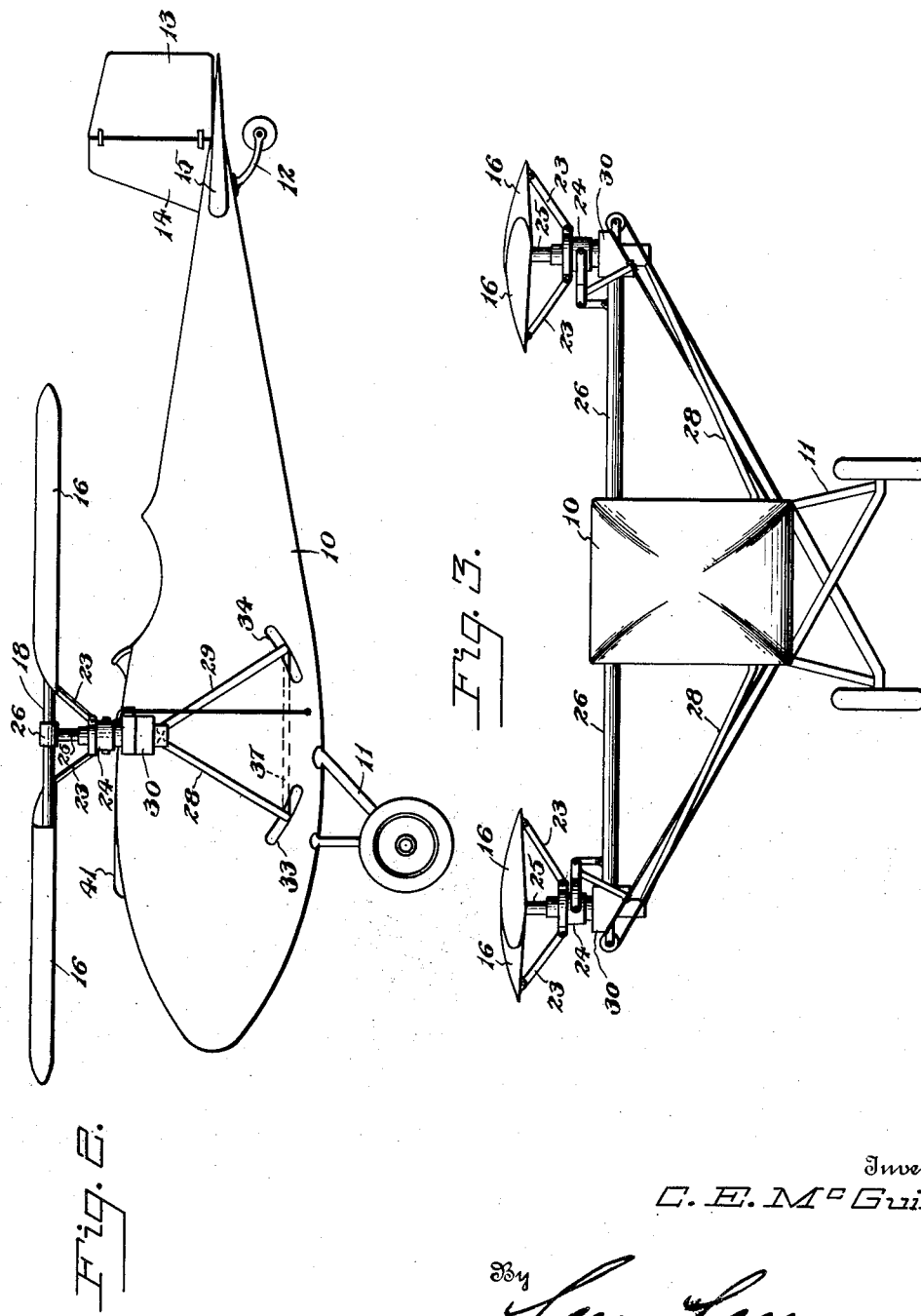

March 15, 1932. C. E. McGUIRE 1,849,766
AIRPLANE
Filed Oct. 21, 1930 5 Sheets-Sheet 3
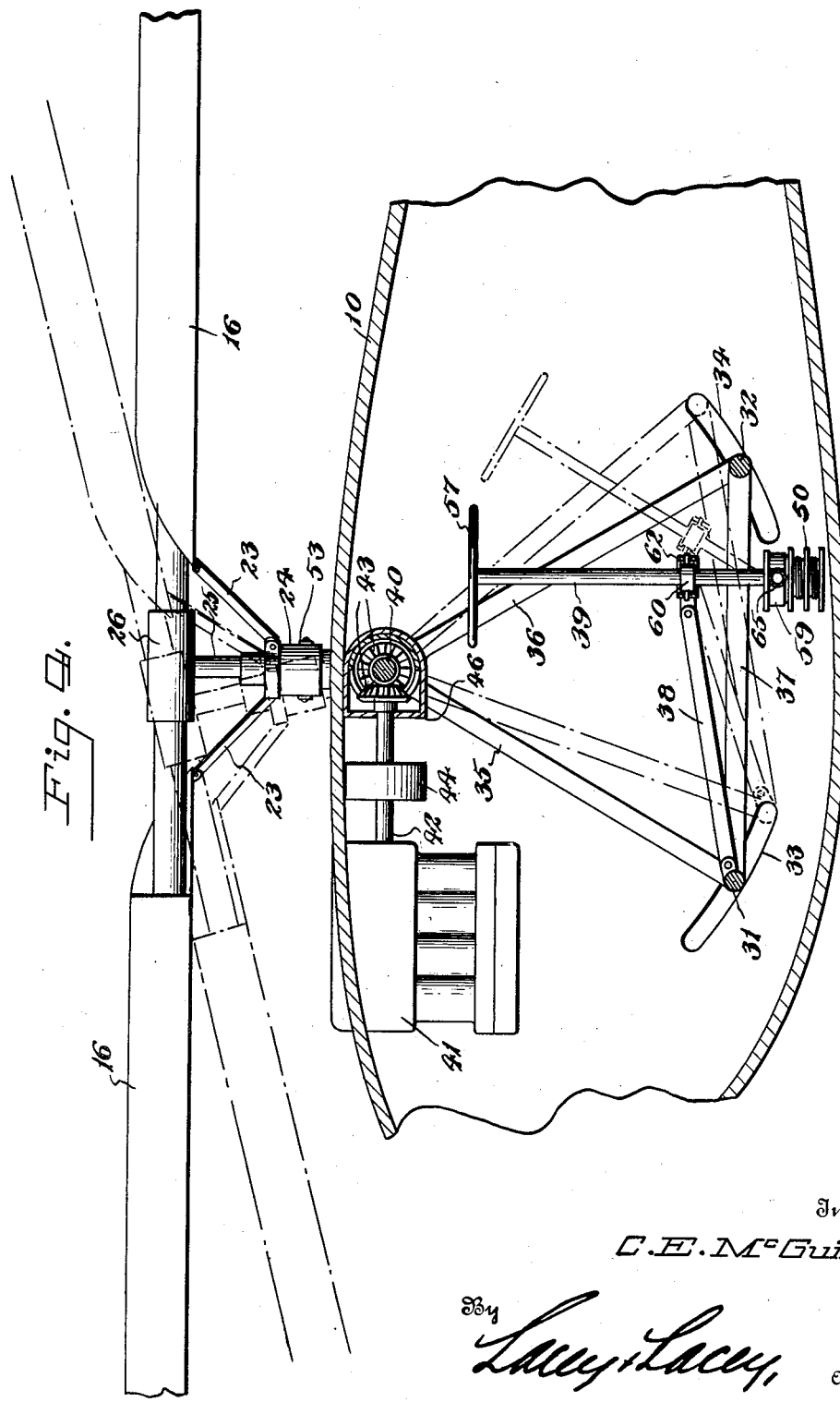
Inventor
C. E. McGuire
By Lacey & Lacey, Attorneys March 15, 1932. C. E. McGUIRE 1,849,766
AIRPLANE
Filed Oct. 21, 1930 5 Sheets-Sheet 4
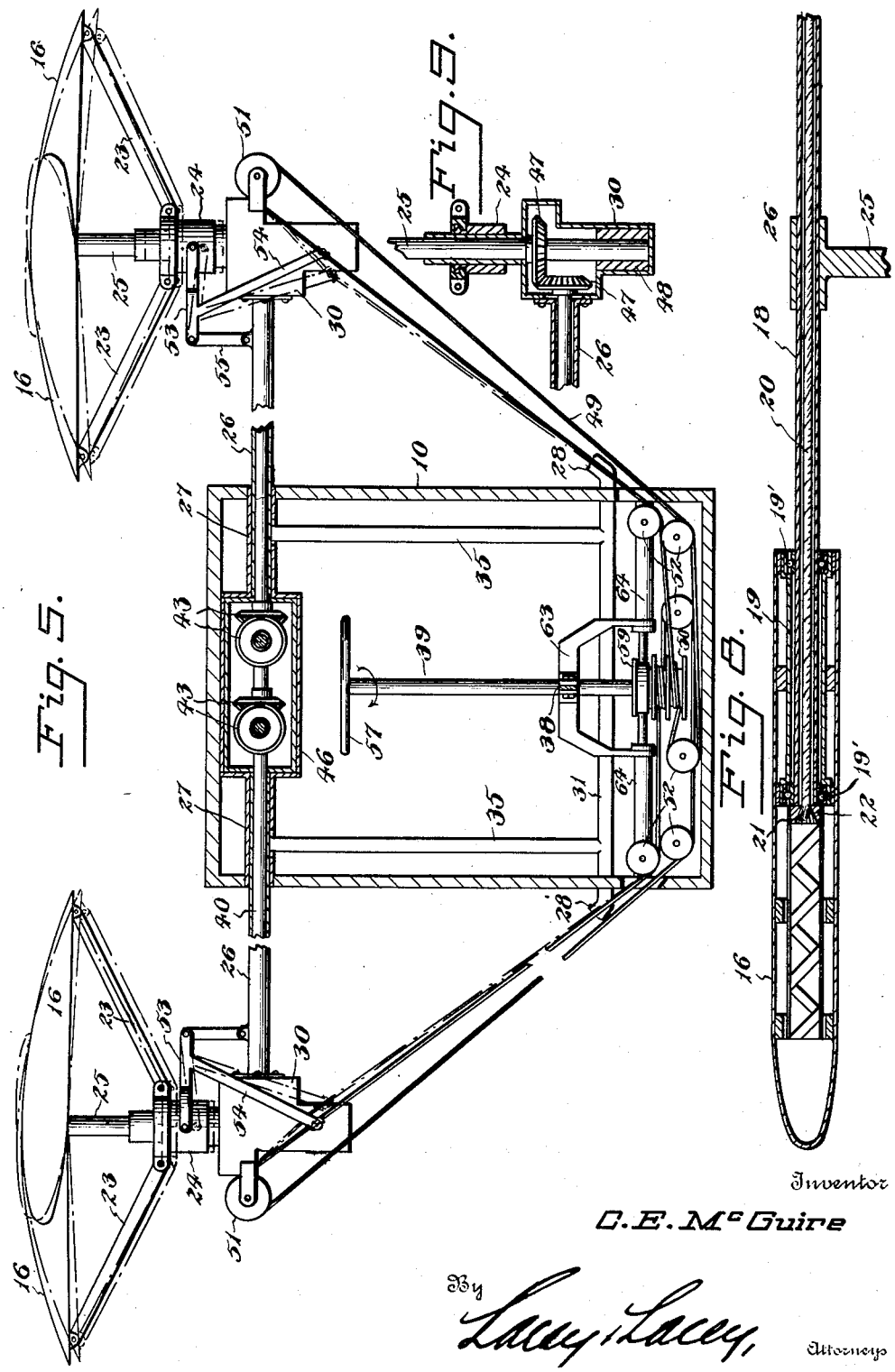
Inventor
C. E. McGuire
By Lacey & Lacey, Attorneys

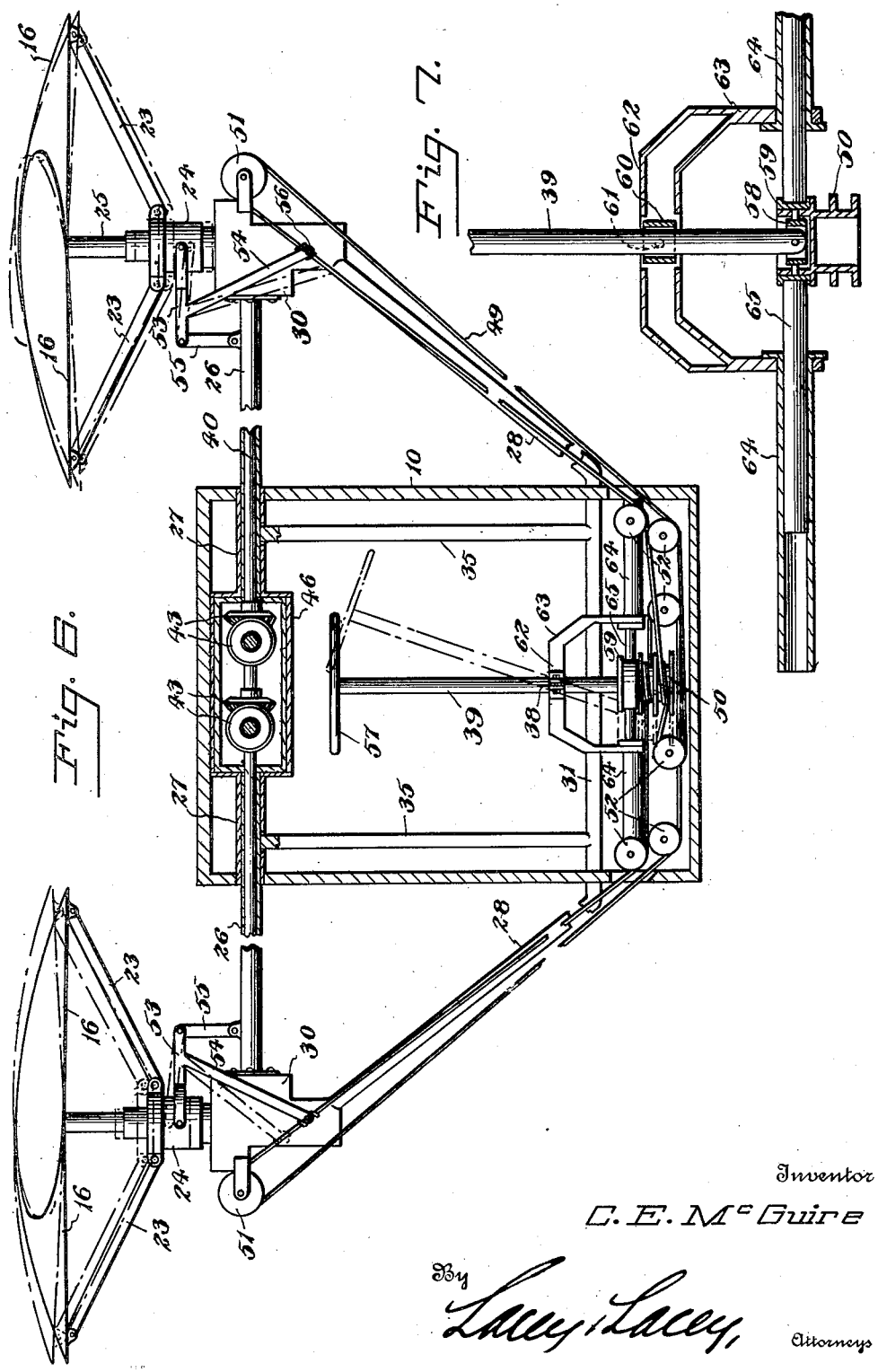

Patented Mar. 15, 1932

1,849,766

UNITED STATES PATENT OFFICE

CECIL E. McGUIRE, OF DOUGLAS, ARIZONA

AIRPLANE

Application filed October 21, 1930. Serial No. 490,242.

This invention relates to airplanes of the helicopter type and has for an object to provide a ship of this type embodying sustaining wings each composed of a pair of standard wing sections pivotally mounted on a single beam whereby the attack angle may be varied as desired.

A further object is to provide a ship in which the sustaining wings are carried by a truss which is pivotally mounted to the fuselage so that in reality the fuselage hangs from the members of this truss or framework with its center of gravity substantially directly below the support or pivot point of the truss. Consequently by swinging the truss upon its pivot I may change the direction of thrust of the wings, forward tilting producing a forward component of thrust to give the plane traction without the use of a front propeller.

A still further object is to provide a flexible steel cable connecting the opposite wing sections constituting each wing whereby to balance the centrifugal force thereon.

A still further object of the invention is to provide a ship having a rotating wing mounted on each end of a truss pivoted to the fuselage, the wings being geared together for positive rotation by power but being automatically disconnected for free rotation as windmills should the power fail, whereby safety in landing may be effected.

A still further object is to provide novel clutch mechanism for connecting the power plant to the common driving shaft of both wings whereby should one unit of the power plant fail it will be automatically disconnected so that the power of the other unit may be utilized in descent.

A still further object is to provide a novel control system for changing the pitch of the wing sections of both wings simultaneously and to the same degree for ascent and descent, as well as for increasing the pitch of the sections of one wing while decreasing the pitch of the sections of the other wing for banking and maintaining lateral stability.

With the above and other objects in view the invention consists in certain novel details of construction and combination of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a top plan view of an airship constructed in accordance with my invention, Fig. 2 is a side elevation of the airship, Fig. 3 is a front elevation of the airship, Fig. 4 is a detail longitudinal sectional view showing in dotted lines the control stick rocked back to vary the angle of incidence of the wings for traction purposes, Fig. 5 is a detail transverse sectional view showing in dotted lines the pitch of the wing sections changed simultaneously and to the same degree by turning of the wheel control to increase or decrease the lift as well as for traction, Fig. 6 is a view similar to Fig. 5 but showing in dotted lines the control stick rocked laterally to increase the pitch of the sections of one wing and decrease the pitch of the sections of the opposite wing to facilitate banking.

Fig. 7 is a fragmentary sectional view of the control stick and mountings thereof, Fig. 8 is a detail longitudinal sectional view showing the cable which connects the wing sections comprising each wing to equalize centrifugal force thereon, Fig. 9 is a fragmentary sectional view showing the reducing gear connection between the axle and driving shaft of each wing, Fig. 10 is a fragmentary detail view showing the construction of the clutch mechanism, and Fig. 11 is a detail elevation of the ratchet clutch.

Referring now to the drawings in which like characters of reference designate similar parts in the various views, 10 designates a conventional fuselage having an under carriage 11, tail skid 12, vertical rudder 13, and stabilizers 14 and 15. The elevator flaps are not illustrated since they may be dispensed with ordinarily as the variable pitch wings hereinafter described serve to direct movements of the ship.

By referring to Fig. 1, it will be seen that the sustaining wings are each composed of a pair of identical sections 16 of standard construction as to chord and camber. The internal ribs and braces are, of course, strengthened to withstand the strain of the centrifugal force developed by the rotating wings. The opposed inner edges of the wing sections are curved, as shown at 17, in the radius of a circle struck from a center midway between said sections.

A tubular beam 18, shown in detail in Fig. 8, connects both sections of each wing and extends longitudinally of the sections at approximately the center of pressure thereof which ordinarily is located near the leading edge of a wing. The wing sections 16 are each swiveled on the beam as an axis by means of a sleeve 19 and anti-friction bearings 19' secured in the wing section structure in any suitable manner and rotatably receiving the corresponding end of the beam.

A steel cable 20 is housed in the beam and each end 21 thereof is rigidly secured to a corresponding wing section by means of a tapered clamp 22 carried within the internal structure of the wing section and supported on the end of the bearing sleeve 19. This cable transmits the centrifugal force from one wing section to the opposing wing section whereby thrust between each sleeve, bearings and the beam is equalized. This enables the wing sections to be easily moved to change the pitch angle thereof since only the radial bearing friction will resist such movement plus an inappreciable amount offered by torsion of the cable through a few degrees.

As above stated, the wing sections are free to turn around the beam 18 as an axis. The sections are held at the desired pitch angle by connecting rods 23, shown in plan in Fig. 1 and in front elevation in Fig. 6. The outer ends of the connecting rods are pivoted to the trailing edges of the wing sections 16 and the inner ends are pivoted to a sliding sleeve 24 mounted on a vertical axle 25 which is rigidly secured at the upper end, as shown at 26 in Fig. 8, to the beam 18 midway between the wing sections. Raising or lowering of the sleeve, as will presently be described, moves the trailing edges of the wing sections correspondingly to change the pitch angle thereof simultaneously to an equal amount to increase or decrease the wing lift or thrust.

For the purpose of traction or propulsion as well as horizontal forward control, the axles 25 of the wings are mounted on, and are adapted to be swung forwardly and backwardly by, a truss or frame. The top tubular members 26 of the truss are pivoted to turn in housings 27, best shown in Fig. 5, rigidly secured in any preferred manner to the fuselage substantially above the center of the gravity thereof. The truss may be swung pendulum-like in the pivotal mountings or housings 27 to tilt the wings, as shown for instance in dotted lines in Figure 4. By tilting the wings forward, a component of the lifting force is converted into a horizontal force so that the pilot may govern his horizontal speed by thus changing the incidence angle of the wings.

The truss comprises front and rear outriggers or struts 28 and 29 projecting from each side of the fuselage, as shown in Figs. 1 to 3 inclusive. The upper ends of the struts are rigidly secured preferably to gear housings 30 on the outer ends of the top tubular members 26. Transverse front and rear bars 31 and 32, best shown in Figs. 4 and 5, connect the lower ends of the front struts and rear struts respectively and pass through arcuate slots 33 and 34 in the fuselage, the radius of curvature of the slots being struck from the housings 27 as a center.

A pair of inclined braces 35 connect the front transverse bar 31 rigidly to the top tubular members 26 of the truss, as best shown in Figs. 4 to 6 inclusive. A similar pair of inclined braces 36 connect the rear transverse bar 32 to said top tubular members. As shown in Figs. 2 and 4, a pair of longitudinal braces 37 connect the transverse bars 31 and 32.

The above described truss is swung pendulum-like by a connecting link 38, pivoted to the front transverse bar 31 and to the hereinafter described yoke of the stick 39, during forward and backward movement of the stick. It will be particularly pointed out that since the truss is pivotally attached to the fuselage by its top horizontal members 26, in reality the fuselage hangs from said top members with its center of gravity directly below the support or pivot housings 27 of the truss.

Both wings are simultaneously power driven from a common drive shaft 40 housed within the tubular top members 26 of the truss. Preferably the power plant consists of a pair of similar power units or engines 41 disposed side by side, or otherwise, in the fuselage. The crank shafts 42 of both units are geared to the common drive shaft by beveled gears, designated in general by the numeral 43.

The crank shafts are each preferably equipped with a ratchet clutch, as shown in Fig. 11, comprising a disk 44 equipped with peripheral cam notches, a race drum 45, and rollers 45' seated in the cam notches. When the disk revolves in the direction of the arrowhead, the rollers lock the drum and disk for rotation as a unit, but when the disk rotates in a reverse direction, or if it is stopped and the drum continues to rotate, the rollers move to the deep ends of the cam notches and free the disk from the drum, and there is nothing to resist auto-rotation of the wings. Beyond the cluthes the crank shafts enter the housing 46 of the gears 43, as best shown in Figs. 5 and 10.

The two motors preferably generate only enough power for flight and maneuvering the ship. In case one motor fails, flight can be sustained and a safe landing made on the other motor since it requires only about one-half as much power to land a ship of this type under perfect control as is required to give it proper maneuverability.

The purpose of the ratchet clutches is to automatically disconnect a dead motor since the mating unit will continue to drive the shaft 40 while the clutch of the dead motor slips, as will be readily understood. If for any reason both motors should fail at the same time, both wings may be set to a negative angle to the horizontal, as will be presently explained, so they will auto-rotate, in the nature of windmills, to sustain the plane in making a landing at a rate of speed proportional to the wing area and weight of the ship. When the ship nears the ground, the wings will then be set to a positive or lift angle and their centrifugal force will maintain rotation of the wings long enough to check rapid descent and permit the ship settling gently to the ground.

The common drive shaft 40 is geared to the ends to both wing axles 25 by beveled gears, designated in general by the numeral 47 and best shown in detail in Fig. 9. The gears are preferably proportioned to reduce the speed of the drive shaft 26 as transmitted to the wing axle 25. The above mentioned gear housing 30 carried by the top tubular member 26 houses both gears. Also the lower end of the axle is journaled in a bearing 48 disposed in the bottom of said gear housing.

The control stick 39 in addition to controlling the forward and backward inclination of the wings, or angle of incidence from the horizontal, may also be shifted laterally to control the pitch of the wing sections of each wing and to accomplish this change of pitch, by referring to Fig. 6, it will be seen that cables 49 are attached to and wrapped around a drum 50 connected to the stick. The cables are trained over sheaves 51 carried by the above mentioned gear housings 30 and over other sheaves, designated in general by the numeral 52, and arranged in any preferred manner in the bottom of the fuselage. A yoke or shipper 53, equipped with an operating lever 54, is provided for each wing. The yoke is fulcrumed on a link 55 carried by the corresponding tubular top member 26 of the truss. The branches of the yoke are pivoted to the sliding sleeve 24. The lever 54 is secured to the upper reach of the corresponding cable 49, as shown at 56. Obviously, when the stick is swung to the left, as shown in Fig. 6, the sliding sleeve of the left wing will be lowered with resultant lowering of the trailing edges of both opposing wing sections 16. The pitch of the sections is thereby increased. Simultaneously, shifting of the stick to the left will decrease the pitch of the wing sections of the right wing.

It will be understood that by moving the stick from side to side, the drum slides correspondingly and pulls the control cables in one direction on one side and in the opposite direction on the other side of the fuselage so that the pitch angle is increased in the pair of wing sections of one wing and is decreased in the pair of wing sections of the opposite wing. Banking, as well as maintaining lateral stability of the ship, is thus effected by lateral movement of the stick, as is customary in standard practice.

The stick is equipped with a hand wheel 57 which may be rotated, as best shown in Fig. 5, to change the pitch of the opposing wing sections of both wings simultaneously and to the same degree to increase or decrease the lift. The stick is connected to the cable drum 50 by a universal joint 58, best shown in Fig. 7. A collar 59 carried by the hereinafter described guide shaft 65, houses the universal joint. The universal joint permits of the drum being rotated by the wheel during various angular positions of the stick. A collar 60, having trunnions 61 journaled in the head 62 of a yoke 63, slidably receives the stick and permits shifting of the stick while insuring positive rotation of the drum when the hand wheel is turned, without binding of the parts.

During rotation of the hand wheel, the cables wind on one side of the drum and wind off on the other side of the drum with resultant movement of the shippers 53 to move the trailing edges of the opposing wing sections of both wings in unison up or down, the latter position being shown by dotted lines in Fig. 5. The pitch of the opposing wing sections of both wings is thus simultaneously varied to the same degree to increase or decrease the lift.

As best shown in Fig. 7, the stick 39 is pivoted by the collar 60 on the yoke 63, as above described. The branches of the yoke are pivoted on alined tubular bearings 64 which are secured in any preferred manner to the fuselage, to permit of the stick being swung forward or backward. The heretofore mentioned guide shaft 65 is slidably fitted in the bearing 64 and is equipped, as above explained, at its center point with the collar 59 which carries the universal joint 58. This specific mounting of the stick permits of lateral as well as forward and backward pivotal movement of the stick to control the pitch angle as well as the incidence angle of both wings.

Preferably, the power plant of the plane consists of two motors as above explained, and preferably each of these motors will develop one-half the total power required to navigate the ship. About one-half the total power will be usually required to sustain the weight of the plane and the other half will be required for propulsion and traction as well as for ascending. In the event of the failure of one motor, power developed by the other will be amply sufficient to enable the pilot to maintain control and altitude until a suitable landing place can be located.

It is not intended to limit the opposing sections of each wing to a single pair as four or more wing sections may be employed if desired. It will be pointed out that the rotating wings are rotated in opposite directions so that the torque will be neutralized. It will be further pointed out that the rotating wings interdigitate or mesh during rotation, However, it is not intended to limit the wing construction to intermeshing wings, since the wings may be spaced far enough apart so that they do not overlap, if desired.

In operation, the pitch of the wing sections is varied for traction as well as for ascent and descent. The pitch angle, of course, must be positive for taking off, but for landing it need not necessarily be negative since the engines may be throttled down until the lifting force of the wings is decreased to less than the weight of the plane and it may then descend at a speed in proportion to the force resisting it. In case of a dead stick landing, it will be necessary to set the wings to a negative angle of probably four or five degrees so they will auto-rotate.

The variable pitch wing construction is of equal importance for traction purposes in a horizontal direction. Since the pitch which is efficient for ascent or descent is comparatively flat and therefore devoid of thrust in a horizontal direction, it is necessary to use the maximum pitch for horizontal flight partly to compensate for the air speed and partly to utilize all of the available motor power not utilized for sustaining the weight of the plane. In addition to using the maximum pitch of the wings, the angle of incidence of the wings must be increased, as shown by dotted lines in Fig. 2, that is, the wings must be inclined forward until the vertical component of thrust will just sustain the plane and the balance of the thrust will be utilized for traction.

From the above description, it is thought that the construction and operation of the invention will be clearly understood without further explanation.

Having thus described the invention, I claim:

1. In a helicopter, a rotary sustaining wing including a tubular beam, wing sections swiveled on the ends of the beam, a steel cable housed in the beam and connected to said sections for equalizing the thrust of the sections on the beam, and means for varying the pitch of said sections on the beam.

2. In a helicopter, a rotary sustaining wing comprising a tubular beam, an axle secured to the beam for rotating the beam, opposed wing sections swivelly mounted on the ends of the beam, a cable housed in the beam and connecting said sections together, and a sliding sleeve on said axle operatively connected to the trailing edges of said sections for changing the pitch angle of the sections on said beam.

3. In a helicopter, a rotary sustaining wing including a tubular beam, opposed wing sections swiveled on the ends of said beam, an axle secured to substantially the center point of the beam for rotating the beam, the inner ends of said sections being curved in the arc of a circle struck from said axle as a center, a steel cable loosely housed in said beam and rigidly secured at the ends to said sections, and tubular housings carried by said sections and pivotally receiving the ends of said beam, said cable equalizing thrust of said beam on said housings due to centrifugal force exerted by said sections.

4. In a helicopter, a rotary wing including a tubular beam, wing sections swiveled on the ends of said beam at substantially the centers of pressure of the sections, tubular housings carried by the sections and pivotally receiving said beam, and a cable housed within the beam and rigidly secured at the ends to said sections for equalizing the centrifugal thrust of said sections on the beam and housings thereof.

5. In a helicopter, a rotary wing comprising a tubular beam, wing sections of substantially identical structure as to camber, chord and bracing ribs, tubular housings carried within the internal structure of said wing sections and housing the ends of said beam, and a steel cable trained through said beam and rigidly secured to said sections.

6. In an airship, a fuselage, a truss projecting from opposite sides of the fuselage, rotary wings extending normally horizontally above the fuselage and carried by the ends of said truss, means for swinging the truss pendulum-like to tilt said wings and change the angle of incidence or thrust thereof, each wing comprising pivotally mounted opposing sections, and means operatable independently of said truss for changing the thrust angle of said sections.

7. In an airship, a fuselage, a control wheel therein, rotary wings carried by the fuselage and each comprising a beam and swivel opposing wing sections on the ends of the beam, axles carried by said beams midway between the wing sections thereof, sliding sleeves on said axles operatively connected to the trailing edges of said wing sections, a drum operatively connected for rotation as a unit with said control wheel, cables carried by said drum and operatively connected to said sliding sleeves whereby one of said cables is wound on the drum and the other of said cables is wound off the drum during rotation of the wheel to correspondingly move said sliding sleeves in unison in the same direction to increase or decrease the pitch angle of said wing sections to the same degree.

8. A device for aeronautical purposes comprising a rotary beam, swiveled air foils on the ends of the beam, a cable passed through the beam and terminally connected to the air foils for the purpose of equalizing centrifugal force on the beam and air foils, and means for varying the pitch of said air foils.

In testimony whereof I affix my signature.

CECIL E. McGUIRE. [L. S.]